May 26, 1970    D. W. ROWELL    3,513,682
METHOD FOR PROCESSING WELDED TUBE
Filed July 13, 1967
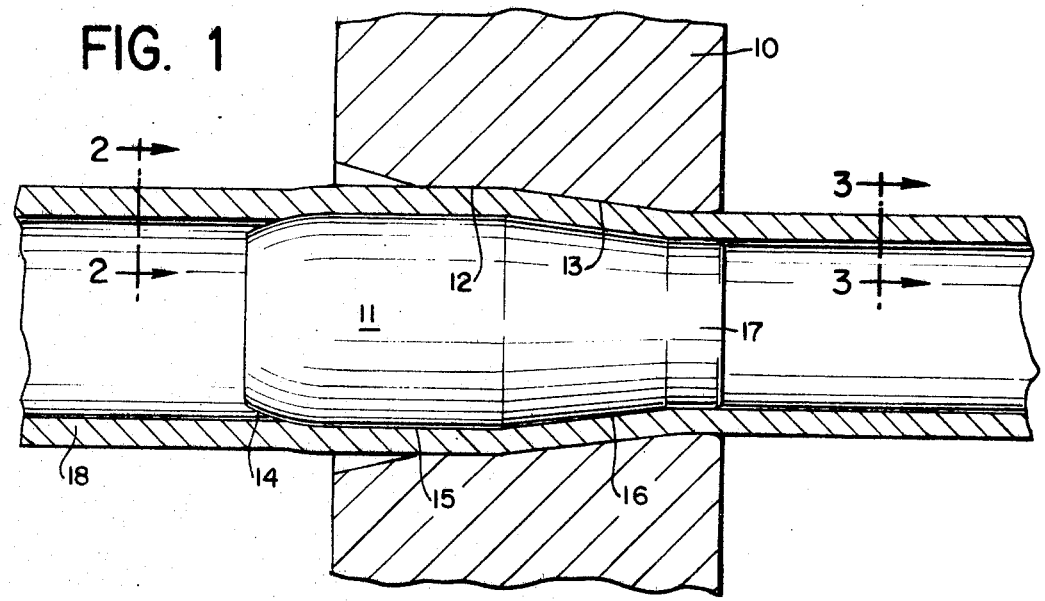
FIG. 1
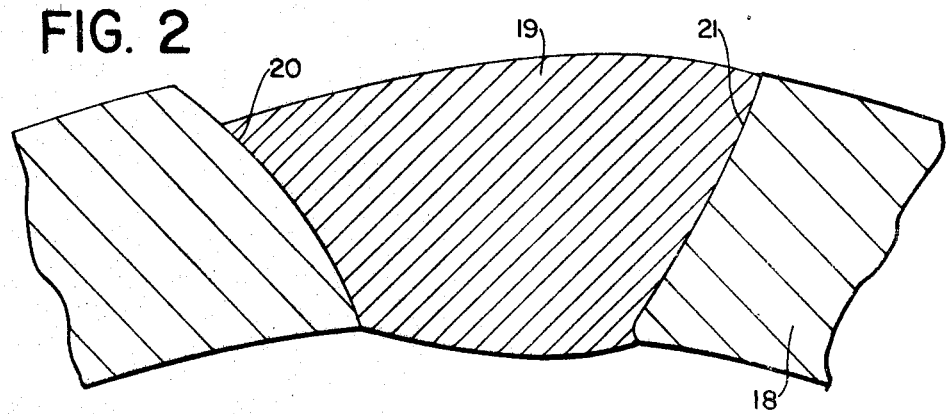
FIG. 2
FIG. 3
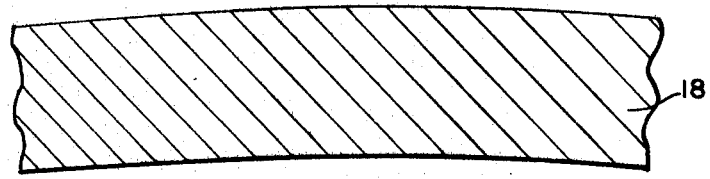
INVENTOR
DOUGLAS W. ROWELL
BY Pennie, Edmonds, Morton, Taylor & Adams
ATTORNEYS

# United States Patent Office 3,513,682
Patented May 26, 1970

3,513,682
METHOD FOR PROCESSING WELDED TUBE
Douglas W. Rowell, Woodbury, Conn., assignor to Anaconda American Brass Company, Waterbury, Conn., a corporation of Connecticut
Filed July 13, 1967, Ser. No. 653,243
Int. Cl. B21c *1/00;* B23k *31/06*
U.S. Cl. 72—283                2 Claims

ABSTRACT OF THE DISCLOSURE

A welded tube, joined along a longitudinal seam by a welded joint of irregular lineal contour, is drawn over a mandrel to a larger inside diameter without confining the outside wall of the tube to smooth out the weld joint on the inside of the tube; it is then drawn between a die and a mandrel while the inside wall of the tube is completely supported in its expanded diameter so as to reduce the wall thickness of the tube and smooth out the welded joint on the outside wall of the tube. Thereafter the tube is further drawn between a die and a mandrel to smaller inside and outside diameters than its starting diameters to produce a uniform contour tube in which the weld joint is indistinguishable.

BACKGROUND OF THE INVENTION

This invention relates to a method and apparatus for improving the contour of welded tubes by a drawing operation.

Welded tubes offer the major benefit that extremely long and heavy units can be produced and these can be further processed as single units in continuous long lengths. Furthermore, for certain purposes lengths of welded tubes can be obtained which are greater than those presently available from seamless tubes.

A difficulty arises in processing welded tubes in that the weld seam produces what is essentially a defect in the general contour of the tube because of its irregular lineal contour. This defect, which is due to irregularities in contour at the location of the weld seam, is discussed in U.S. Pat. No. 2,716,692 as occurring in welds made by inert-gas-shielded arc welding and this patent describes a method of preventing such a defect by making a welded joint of adequate uniformity of contour that it will draw out into a smooth surface during subsequent processing operations. I have found that even with the most careful welding operations an irregular contour will result and no reasonable amount of subsequent processing will render the tube satisfactory.

I have also found that these defects at the weld seam may occur in cases of high or low frequency pressure or forge-type welding where a bead of ductile or molten metal is extruded along the length of the tube as the edges of the strip are squeezed together to make the joint. These extruded beads are usually removed by a cutting device, but since the cutting device does not cut the surface to a contour exactly that of the tube, a ridge or valley is left along the tube. Further processing of tubes having this irregularity will result in a similar type of defect in the finished tube.

It is a purpose of this invention to provide a method of processing tubes having lineal streaks of irregular contour in such a manner that the irregularity will be removed within a minimum amount of processing following the welding operation.

SUMMARY OF THE INVENTION

Broadly stated, the invention is a method for processing tubes which are longitudinally seamed by a welded joint of irregular lineal contour by drawing the tube to a smaller diameter having uniform contour on the inside and outside surface. The method comprises drawing the seamed tube over a mandrel of a larger inside diameter than the starting diameter of the tube and expanding it to a larger inside diameter without confining the outside wall of the tube in a die and thereby smoothing out the weld joint on the inside of the tube. Thereafter the tube is drawn through a die of smaller diameter than the outside diameter of the tube while the tube is completely supported on a mandrel to maintain the enlarged inside diameter and thereby reduce the wall thickness of the tube and smooth out the weld joint on the outside surface of the tube. Finally, the tube is drawn between a die and a mandrel to smaller inside and outside diameters than the starting diameters.

When the weld joint is a cast metal it is work hardened during the operation and thereafter subsequently annealed to render it homogeneous with the remainder of the tube.

The apparatus of the invention includes a die having an annular first die surface adjacent the inlet end of the apparatus and an inwardly tapered second die surface extending from the first die surface to the outlet end of the die. A mandrel is positioned within the die and has an annular beveled portion at the inlet end of the apparatus which expands to an intermediate annular surface of greater diameter than the diameter of the annular beveled portion with one end portion of the intermediate annular surface toward the outlet end of the apparatus juxtaposition with the first die surface. An inwardly tapered outlet end portion of the mandrel is in juxtaposition with the second die surface, the mandrel and the die being dimensioned to permit a tube of a starting inside diameter smaller than the diameter of the intermediate mandrel portion and a wall thickness larger than the space between the first die surface and the intermediate mandrel surface to be drawn therebetween.

The intermediate annular surface can be an elongated axially flat surface which would extend for an axial length greater than the axial length of the first die surface so that its end portion adjacent the outlet end of the apparatus is in juxtaposition with the first die surface. The mandrel is also preferably of the floating mandrel type.

BRIEF DESCRIPTION OF THE DRAWINGS

FIG. 1 is a sectional side elevation of a tube being drawn through an apparatus of the invention;
FIG. 2 is an enlarged fragmentary section along the weld zone of the tube taken substantially along lines 2—2 of FIG. 1; and
FIG. 3 is an enlarged fragmentary section of the weld zone after drawing taken along lines 3—3 of FIG. 1.

DETAILED DESCRIPTION

FIG. 1 shows a die and mandrel in the progressive stages of the method of the invention which involve expansion, wall reduction and finally diameter reduction involved in drawing a welded tube so as to eliminate the irregularity in the lineal contour along the weld zone. The apparatus basically consists of a die 10 and a mandrel 11. The die has an annular first die surface 12 and a generally conically shaped second die surface 13. In the embodiment shown in the first die surface 12 is defined by a generally flat axially extending annular surface. Positioned within the die 10 is a floating mandrel 11 which at the inlet end of the apparatus has an annular beveled portion 14 which expands to an intermediate elongated flat annular surface 15 of a greater diameter than the diameter of the annular beveled portion. This intermediate flat annular surface 15 extends for an axial length greater than the axial length of the first die surface 12 and has its end portion nearest the outlet end of the apparatus in juxtaposition with the first die surface. At the outlet end portion of the mandrel 11 is a generally frusto-conically shaped portion of the tube 16 which ends in an axially extending annular endmost portion 17. The mandrel and die are dimensioned to permit a tube 18 of a starting inside diameter smaller than the diameter of the intermediate mandrel portion and a wall thickness larger than the space between the first die surface and the intermediate mandrel surface to be drawn therebetween.

FIG. 2 shows a typical section through the weld zone showing the weld deposit 19 joining opposed edges 20 and 21 of metal sheet which has been rolled into tube form. Irregularity in the cross section of the weld zone is evident from the drawing and this irregularity varies in lineal contour throughout the length of the tube. In a normal drawing operation a tube is pulled between a die and a mandrel in such a manner that both the diameter and the wall thickness are reduced. In the zone between the point of contact of the tube with the die and the point where the tube contacts both die and mandrel the operation consists solely of reducing the diameter of the tube. During this reduction the tube receives essentially a uniform crushing pressure which tends to make the tube wall buckle or fold under compression. As a result when the tube is as shown in FIG. 2 with an irregular weld, any deformation will take place at the weld zone both because the contour is irregular and has increments of lesser thickness, and because the material in the weld zone is either a weak cast type of structure as in the case of the inert-gas-shield arc welds or is of a hot worked or annealed type of structure as in the case of the pressure type of weld. In both cases the weld is weaker or more ductile than the balance of the tube which has had, in the least, the work hardening which resulted from the forming operations involved in making a tubular form out of strip metal.

According to the method of the invention the irregular contour can be removed from a weld tube without causing folds of the type described. In this method the tube successively receives an expansion, a pinch on the wall thickness while the inside diameter is completely supported, and a drop in diameter both inside and outside. Thus the tube 18 is first expanded by drawing over the annular beveled portion 14 and over the enlarged intermediate portion 15 such that any high spots on the I.D. are transformed to high spots on the O.D. at the start of the expansion. This action is encouraged by the soft condition of the tube at the weld zone and the small amount of contact made with the mandrel at the locations where the high spots of the irregularities make contact. The tube is then advanced along the intermediate portion 15 to the point where the first die surface 12 and the outlet end portion of the intermediate mandrel surface 15 are in juxtaposition. The space between the intermediate mandrel surface 15 and the first die surface is less than the wall thickness of the tube. Thus the tube becomes confined between the first die surface 12 and the intermediate mandrel surface 15 while the inside wall surface of the tube has complete support in its enlarged inside diameter against folding. At this point the wall thickness is pinched so that it is reduced substantially and at the same time the tube is formed into a uniform contour. The tube 18 is then drawn between the conical die surface 13 and the conical mandrel surface 16 and out of the apparatus to form a tube finally sized to a smaller diameter.

During the drawing operation the weld zone has received a work hardening due to the fact that the weld zone being weaker undergoes some stretch before the entire tube begins to expand. Thus after this drawing operation it is well to anneal the tube to render it substantially homogeneous to the extent that it can be further processed by any of the acceptable practices to result in a satisfactory product.

In one example a tube having essentially the configuration along one section as shown in FIG. 2 and having an outside diameter of 1.032 inch O.D. and a 0.026 inch wall thickness was reduced to a tube having an O.D. of .996 inch and a wall thickness of .023 inch and the result immediately after drawing as shown in FIG. 3 was a smoothing out of the irregular contour of the section along the tube at the weld zone without causing longitudinal grooves along the inside or outside surfaces. In this example just given the diameter of the intermediate mandrel surface was 1.0 inch and the thickness of the annular opening between the intermediate annular surface of the mandrel and the first die surface was essentially the thickness of the wall thickness or .023 inch.

I claim:
1. A method for processing tubes which are longitudinally seamed by a welded point of irregular linear contour comprising
    (a) drawing the seamed tube over a mandrel of a larger inside diameter than the starting diameter of the tube and expanding it to a larger inside diameter without confining the outside wall of the tube in a die and thereby smoothing out the weld joint on the inside of the tube;
    (b) thereafter drawing the tube through a die of smaller diameter than the outside diameter of the tube while the tube is completely supported on a surface of the mandrel which maintains the enlarged inside diameter of the tube and thereby reducing the wall thickness of the tube and smoothing out of the welded joint on the outside surface of the tube, and
    (c) thereafter drawing the tube between a die and mandrel to smaller inside and outside diameters than the starting diameters.
2. A method according to claim 1 wherein the welded joint is a cast metal which is work hardened using the drawing operation, comprising annealing the tube after the drawing operation to render it homogeneous with the remainder of the tube.

References Cited

UNITED STATES PATENTS

| 307,993 | 11/1884 | Sharp | 72—283 |
|---|---|---|---|
| 2,196,646 | 4/1940 | Smith | 72—283 |
| 2,306,712 | 12/1942 | Poncar | 72—283 |
| 2,355,734 | 8/1944 | Katz | 72—283 |
| 3,243,986 | 4/1966 | Douthett, et al. | 72—283 |

LOWELL A. LARSON, Primary Examiner

U.S. Cl. X.R.

29—480